122,867

UNITED STATES PATENT OFFICE.

JAMES W. TALLMADGE, OF NEW YORK, N. Y.

IMPROVEMENT IN INK-ERASERS.

Specification forming part of Letters Patent No. 122,867, dated January 16, 1872.

Specification describing an improved invention by JAMES W. TALLMADGE, of the city and county of New York and State of New York, called "The Great Lightning Ink-Eraser," to be used instead of a lance or scraper for erasing ink, in order to instantly rectify a mistake or clean off a blot without any injury to the paper, leaving the paper as clean and good to write upon as it was before the mistake or blot was made, and without injury to the printers' ink upon any printed form, or the ruling upon any first-class-paper.

Recipe.—Take of chloride of lime one pound, thoroughly pulverized, and four quarts of soft water. The above must be thoroughly shaken when first put together. It is required to stand twenty-four hours to dissolve the chloride of lime; then strain through a cotton cloth; after which add a teaspoonful of acetic acid No. 8 (commercial) to every one ounce of the chloride of lime water.

The eraser is used by reversing the pen-holder in the hand and dipping the end of the pen-holder into the fluid and applying it (without rubbing) to the word, figure, or blot you wish to erase. When the ink has disappeared absorb the fluid with a blotter, and the paper is immediately ready to write upon again.

I am aware that chloride of lime has before been used with acids for the purpose as above proposed; but in all previous processes, so far as I am aware, the chloride of lime has been mixed with acids that burn and destroy the paper; and for this reason it has proved worthless.

I claim as my invention—

The fluid ink-eraser, composed of acetic acid and a solution of chloride of lime, compounded as herein described.

JAMES W. TALLMADGE.

Witnesses:
    ALONZO M. HOWE,
    CHAS. CONS. CALLAN.

(146)